Aug. 11, 1959 A. S. DUBUAR 2,899,503

DIAL TELEPHONE SYSTEM ARRANGED FOR MACHINE ANNOUNCEMENT ON INTERCEPTED CALLS

Filed Dec. 14, 1956 3 Sheets-Sheet 1

INVENTOR
A. S. DUBUAR
BY A. F. Kane
ATTORNEY

Aug. 11, 1959 A. S. DUBUAR 2,899,503

DIAL TELEPHONE SYSTEM ARRANGED FOR MACHINE ANNOUNCEMENT ON INTERCEPTED CALLS

Filed Dec. 14, 1956 3 Sheets-Sheet 2

INVENTOR
A. S. DUBUAR
BY
A. F. Kane
ATTORNEY

Aug. 11, 1959 A. S. DUBUAR 2,899,503

DIAL TELEPHONE SYSTEM ARRANGED FOR MACHINE ANNOUNCEMENT ON INTERCEPTED CALLS

Filed Dec. 14, 1956 3 Sheets-Sheet 3

INVENTOR
A.S. DUBUAR
BY A. F. Kane
ATTORNEY

United States Patent Office 2,899,503

Patented Aug. 11, 1959

2,899,503

DIAL TELEPHONE SYSTEM ARRANGED FOR MACHINE ANNOUNCEMENT ON INTERCEPTED CALLS

Arthur S. Dubuar, Parsippany, N.J., assignor to Bell Telephone Laboratories, Incorporated, New York, N.Y., a corporation of New York Application December 14, 1956, Serial No. 628,321

6 Claims. (Cl. 179—18)

This invention relates to telephone systems and particularly to systems in which telephone connections between calling and called stations are completed by automatically-operated switching devices under the control of the calling stations.

In certain dial offices, some of the lines served are party lines which require code ringing, and others are trunk lines to private branch exchanges which necessitate the use of rotary hunting connectors in the switch train. It is common practice in such offices to utilize the same connector switch to accommodate both individual and multiparty lines and private branch exchange trunk lines, in which case one or more switch levels are allocated to trunk lines and the switch is arranged to automatically hunt in such levels, and to be directively advanced to particular line or station terminals in all other levels. Frequently, in such arrangements and particularly in the case of multiparty lines served by the connector, a condition is encountered in which the calling subscriber, unwittingly or otherwise, dials a station designation which is unassigned. In such a situation in which the corresponding terminals are not connected, the connector is advanced to the vacant switch terminals corresponding to the number dialed and, finding neither busy ground nor idle line battery on the sleeve terminal, remains set on the seized terminals without functioning to advise the calling party of the abnormal condition encountered. The calling party, failing to hear a busy tone signal or an audible ringing signal, is at a loss to comprehend why the originated call has not been completed or why, upon failure of such completion he has not been apprised by the usual appropriate tone signals. In all probability he would again attempt to complete the call by redialing the unassigned number with the same unsatisfactory results.

It is the object of this invention to overcome the inadequacies of known telephone connector switches in servicing calls directed to unassigned, or vacant switch terminals, and otherwise to increase the efficiency of such switches from the viewpoint of economy in the amount of equipment needed to complete connections.

This object is attained in accordance with a feature of the invention by providing, in a double-capacity connector switch having access to 200 sets of multiple bank terminals instead of the more conventional 100 sets and which services multiparty lines on a terminal per station basis, and rotary hunts on predetermined specified levels allocated to outgoing trunk lines, means for recognizing the seizure of unassigned switch terminals and for effecting the transmission of appropriate informative signals to the call-originating station.

A particular feature of the invention contemplates means, in the connector switch, for recognizing and discriminating between three different sleeve conditions which may be encountered in the process of completing, or attempting to complete connections to called stations. More particularly, the connector of this invention is equipped not only to recognize the usual busy ground and idle battery sleeve conditions encountered in the normal servicing of telephone calls, but also to recognize an open-sleeve condition, indicative of an unassigned or vacant set of switch terminals, and to automatically apprise the call-originating party of the encountered condition.

In accordance with another feature of the invention, seizure of an unassigned or vacant terminal set in the connector automatically directs the originated call to a machine intercept trunk and initiates the operation of an announcement device to effect the transmission of an informative message to the call-originating party.

A further feature of the invention resides in rendering the intercept trunk available directly to the connector switch without having to go through the multiple bank terminals with which the switch brushes are in contact, and in making intercept service available merely by opening the sleeve lead associated with the sleeve terminal of the line or station involved.

A clear and comprehensive understanding of the invention will be obtained by a consideration of a telephone system and a connector switch therein arranged in accordance with the invention, one such system and switch being shown schematically in the accompanying drawings which form a part of this specification.

Referring to the drawings.

The subscriber's telephone set on station A is of the usual type comprising a dial D for use in controlling the establishment of desired connections. The subscriber sets at the stations connected to the multiparty line L10 are arranged so that the ringers at five stations, including station B, are connected to the conductor 277 of line L10 and the ringers at the remaining stations, including station E, are connected to the conductor 278 of line L10. Stations B and E are shown complete while each of the remaining eight stations is represented only by its ringing condenser and ringer. Each of the line finder, selector and connector switches, is of the well known two-motion, step-by-step type. It is to be understood that the number of selectors required to complete connections depends upon the size of the involved system and the number of digits in the subscribers' telephone numbers. The three selectors S–1, S–2 and S–3 are illustrated merely for exemplary purposes.

The connector switch C comprises two sets of brushes UB and LB, a bank of terminals, one level of which, the zero level by way of example, is shown serving a group of trunk lines to a private branch exchange, and another level is shown serving the ten-party line L10 on a terminal per station basis. Each group of four terminals, such as the group Y2, is allocated to a different one of the stations on line L10, each sleeve terminal thereof, such as ST, being connected in multiple with other similar sleeve terminals to the common sleeve lead S, and each ringing control terminal thereof, such as AT, being connected to a different lead extending to the ringing interrupter R which may be of any well-known design. Suffice it to say with respect to R, that the interrupter supplies the various ringing codes by which the ten stations on line L10 are signaled.

Figures 1, 4:
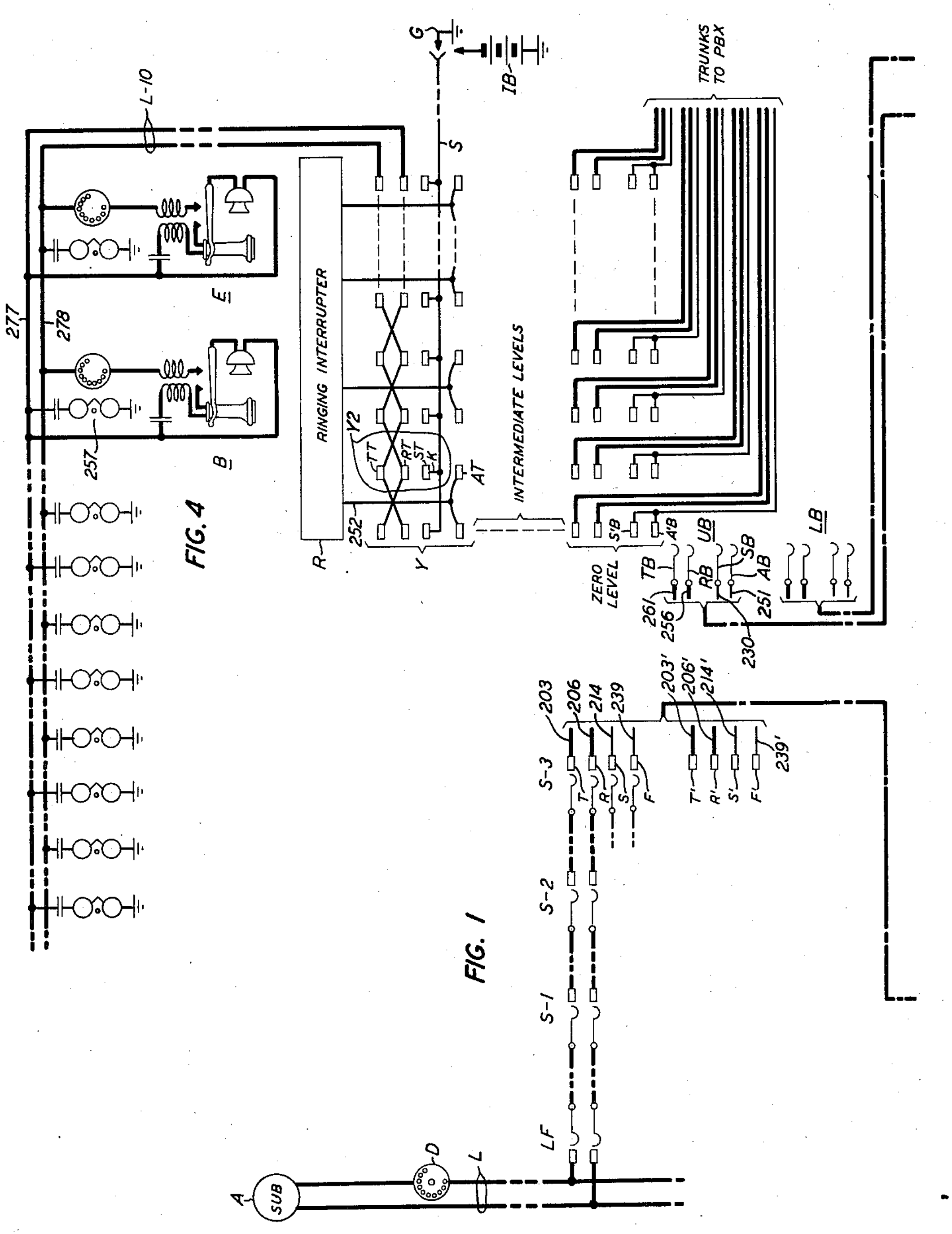
Fig. 1 shows a subscriber station A and line L terminating in an automatic telephone office, a line finder switch LF, first, second and third selector switches S–1, S–2 and S–3.
Fig. 4 shows a ten-party line L10, a group of trunk lines to a private branch exchange, and wipers and bank terminals of the connector C.
Figure 2:
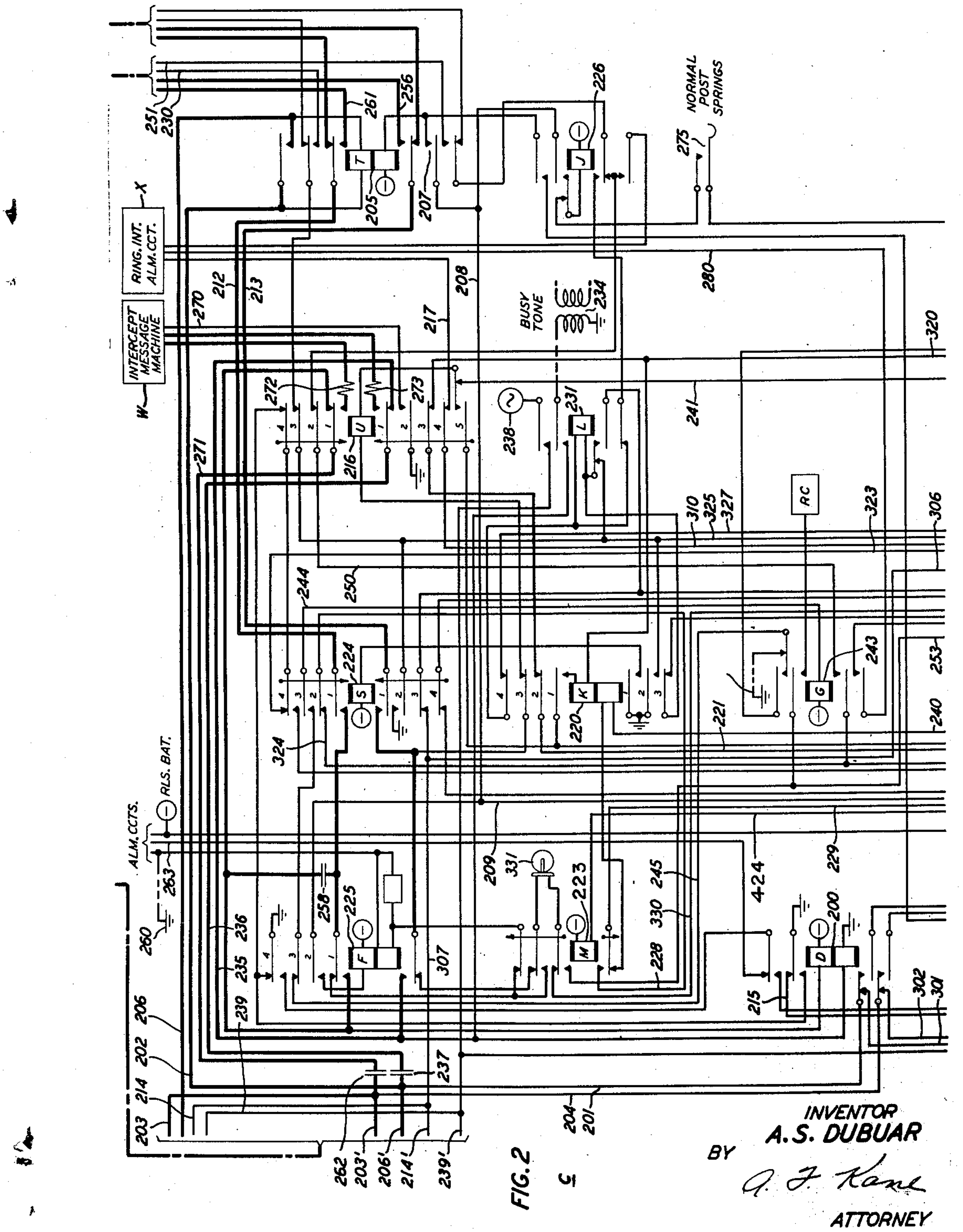
Figs. 2 and 3 show the circuitry of the connector switch C embodying the features of the invention.
Figure 5:
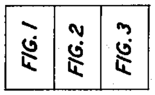
Fig. 5 shows the relative arrangement of Figs. 1 to 3.
Figure 3:
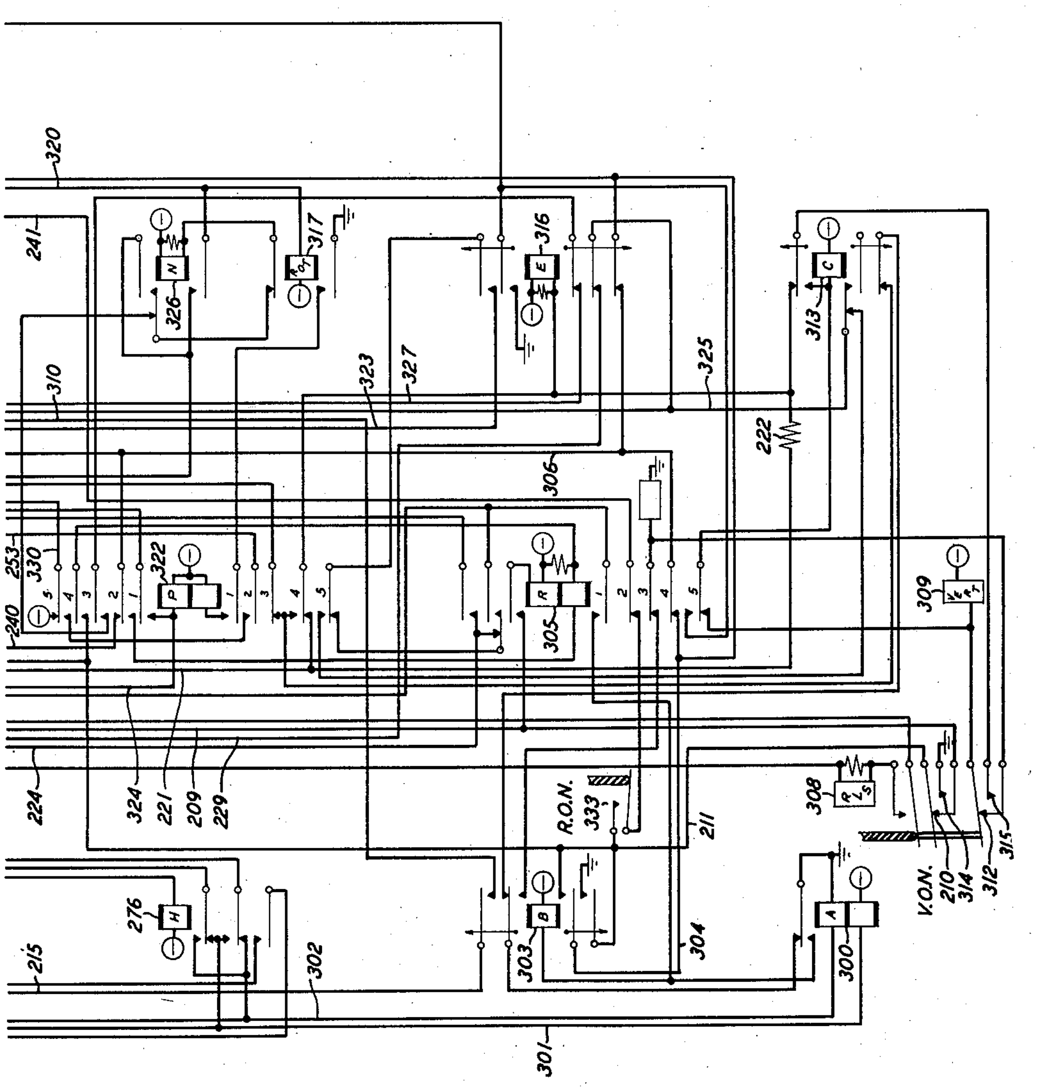

With respect to the sleeve terminal ST, the lead connecting it to the common sleeve lead S is designated by the letter K. In the event that service to station B to which the terminal set Y2 is allocated, is to be discontinued or for any other reason the terminal set Y2 is to be rendered vacant or unassigned, the lead K is merely open-circuited, as will be referred to in greater detail hereinafter. Ground G and battery IB are shown in Fig. 4 connected to the common sleeve lead S. It is to be understood that ground G is employed to indicate a busy condition of the line L10, while the battery IB is used to indicate the idle condition of this line. Under these conditions, the appropriate sleeve potential is applied in well-known manner.

The brushes, or wipers of connector C are positioned on a particular set of terminals in the Y level in response to the two trains of impulses generated or created by the dialing of the tens and units digits of a called subscriber's number at a connected calling subscriber station, such as station A. In the zero level of terminals, the connector C is designed to rotary hunt for an idle trunk line after the brushes of the switch have been moved into engagement with the first set of terminals in response to the dialing of the tens and units digits of the designation identifying the corresponding private branch exchange. It is understood that any level or levels of the connector switch may be allocated to trunks to private branch exchanges.

Assume now that a call, intended for station B, is originated at the station A and that the line finder LF is operated to connect with the terminals of the calling line L in usual and well-known manner, whereby the conductors of line L are extended to the first selector S–1. When the calling subscriber dials the first digit of the number of the called station B, the selector S–1 is directly operated to select a group of trunks, and automatically operated to select an idle trunk in the selected group, the seized terminals of the selected idle trunk being connected to the selector S–2. Subsequent digits dialed by the calling subscriber advance the connection through selector S–2 to selector S–3 in a similar manner. In the selector S–3, the connector C is identified by two sets of four terminals such as are shown at T, R, S and F and at T', R', S' and F'. The terminals T, R, S and F are connected to the connector leads 203, 206, 214 and 239, respectively, whereas the terminals T', R', S' and F' are connected to the lower corresponding set of connector conductors 203', 206', 214' and 239'. Depending upon which set of terminals is seized by the selector S–3, either the connector brush set UB or the set LB will be selected to further extend the originated call to its ultimate destination. For exemplary purposes, it will be assumed that the connector is seized by way of its upper set of terminals T, R, S and F to enable the upper set of brushes UB to extend the connection originated at station A to the station B on line L10.

*Connector seizure*

When the connector C is seized by the selector S–3, relay 300 operates in a circuit which may be traced from negative battery, through the lower winding of relay 300, over conductor 301, the inner normally closed continuity contacts of relay 200, conductor 201, conductor 202, the upper winding of relay 205, ring conductor 206, ring terminals and associated brushes of the selector switches S–3, S–2, and S–1 and of line finder LF, ring conductor of the calling line L, over the substation loop at calling station A, dialing contacts of dial D, tip conductor of the calling line L, the tip terminals and brushes of line finder LF and of selector switches S–1, S–2 and S–3, tip conductor 203, conductor 204, outer normally closed continuity contacts of relay 200, conductor 302, the upper winding of relay 300, to ground. At its armature and front contact, relay 300, operated, completes an obvious circuit for slow-to-release relay 303, which relay thereupon operates.

When seized by a selector to complete a call in the upper connector bank, as is assumed in the immediate description, relay 205 operates in the above-traced circuit. If the call is to be completed by way of the lower connector bank, relay 205 does not operate. Relay 205, operated, closes its contacts 207 whereupon relay 205 fully operates in a circuit which includes negative battery, the lower winding of relay 205 and its armature contacts 207, conductors 208 and 209, contacts 210 of the vertical off-normal springs VON, conductor 211, outer lower armature and front contact of relay 303, and ground. Relay 205, fully operated, short circuits its upper winding by means of its outermost upper armature and front contact, and at its innermost upper and innermost lower armatures and front contacts transfers the outgoing tip and ring conductors 212 and 213 of the connector C from the lower set of brushes LB to the upper set UB in preparation for completing the call in the upper connector bank (Fig. 1).

Relay 303, operated, connects ground potential to the sleeve conductor 214 for holding the switches in the switch train in their operated positions and to guard the connector C from seizure by other selector switches. This circuit extends from ground at the outer lower armature contacts of relay 303 over the inner lower armature contacts of relay 303, conductor 304, the No. 4 armature contacts of relay 305, conductors 306, and 307, to the sleeve conductor 214. At its inner upper armature and back contact, relay 303 opens the circuit to release magnet 308 and at its inner upper armature and front contact, it prepares an operating circuit for vertical stepping magnet 309 which circuit will be identified more particularly presently. At its outer upper armature and front contact, relay 303 completes a motor start circuit in preparation for ringing, tones and interrupter operation, which circuit includes ground at the inner upper armature and back contact of relay 200, conductor 215, outer upper armature and front contact of relay 303, conductor 310, lower No. 4 armature and back contact of relay 216, and conductor 217. The ringing interrupter and alarm circuit is designated by the block X and is not shown in detail since such equipment is well known in the art. Suffice it to say that when the conductor 217 has ground potential applied thereto, the motor which drives the ringing, tone and interrupter equipment starts to operate. At its outer lower armature and front contact, relay 303 holds relay 205 operated over the circuit previously traced. Other circuits prepared by relay 303 will appear as the description progresses.

*Vertical stepping*

The tens digit dialed by the calling subscriber at station A controls the vertical stepping of the connector switch C so that, upon receipt of the train of pulses corresponding to such digit, relay 300 releases and operates, in well-known manner, to correspondingly operate the vertical magnet 309. The operating circuit for magnet 309 extends from ground at the armature and back contact of relay 300, over the inner upper armature and front contact of relay 303, back contact and lower No. 3 armature of relay 305, contacts 312 of vertical off-normal springs VON, winding of vertical magnet 309, to negative battery. The vertical magnet 309 operates, in well-known manner, to step the shaft of the connector switch in a vertical direction until it reaches the switch level corresponding to the tens digit dialed. In the instant case, this level is assumed to be that represented in Fig. 1 by the bank terminals identified by the letter Y, which terminals are associated with the multiparty line L10.

Relay 313 operates in parallel with the vertical magnet 309 in a circuit which includes the No. 5 lower armature contacts of relay 305. Relays 313 and 303 are slow-to-release, relay 303 remaining operated during pulsing and relay 313 operating on the first release of relay 300 and remaining operated until the completion of the first train of pulses, in this case the pulse train corresponding to the tens digit of the number dialed at station A.

At the first vertical step of the connector switch, the vertical off-normal springs VON operate and (1) prepare an operating circuit for release magnet 308; (2) at contacts 314, substitutes ground for the ground at the outer lower armature of relay 303 in the locking circuit for relay 205; and (3) at contacts 315, completes an obvious locking circuit for relay 313. Thus the brush set UB is now located at the switch level corresponding to the terminal sets W which identify the ten stations on the multi-party line L10.

*Rotary stepping*

The final digit of the station designation dialed at the calling station A, causes the connector switch to rotate step-by-step into the switch level corresponding to the called line L10 until it comes to rest on the terminal set Y2, for example, corresponding to the called station B.

In response to the pulses identifying the final digit of the called number, relay 300 is caused to again release and operate in well-known manner. Relay 316 and rotary magnet 317 now operate in parallel. Relay 316 operates in a circuit which extends from negative battery through the windings of relay 316, back contact and upper armature of relay 313, contacts 315 of springs VON, lower No. 3 armature and back contact of relay 305, front contact and inner upper armature of relay 303, back contact and upper armature of relay 300, to ground. The rotary magnet 317 operates in a circuit which includes negative battery, the winding of magnet 317, conductor 320, back contact and lower No. 3 armature of relay 216, back contact and upper No. 2 armature of relay 220, conductor 221, lower No. 4 contacts of relay 322, back contact and upper armature of relay 313, contacts 315 of springs VON, lower No. 3 armature and back contact of relay 305, front contact and inner upper armature of relay 303, back contact and upper armature of relay 300 and ground. Relay 316, being slow to release, remains operated during pulsing.

Relay 316, operated, partly opens the incoming sleeve conductor 214, from ground at the two lower armature contacts of relay 303, which ground is connected to the lead 306 by way of conductor 304 and the back contact and lower No. 4 armature of relay 305.

Relay 223 is now operated in a circuit which includes negative battery, the winding of relay 223, conductor 424, the normal continuity contacts of relay 305, back contact and lower No. 5 armature of relay 322, outer upper armature and front contact of relay 316, conductor 323, upper No. 4 armatures and back contacts of relays 224 and 216, the back contact and upper No. 4 armature of relay 225 to ground. Relay 223, operated, prepares the circuit for the busy test of the called line L10; prepares a circuit for operating relay 322. At the completion of the dialing of the final digit of the called station number, relay 316 releases and the brush set UB is now in engagement with the terminal set Y5 which corresponds to, or is identified with, the called station B.

*Called line busy*

If the called line L10 is busy, ground potential will be found on the sleeve lead S. This condition is represented by the ground convention G in Fig. 1. When relay 316 releases at the completion of the dialing operation, as described above, the circuit to slow-to-release relay 223 is opened at the outer upper armature contacts of relay 316. Before relay 316 releases, however, relay 322 operates in a circuit which may be traced from negative battery through the upper winding of relay 322, over conductor 324, back contact and upper No. 2 armature of relay 224, conductor 228, front contact and inner lower armature of relay 223, conductor 229, back contact and middle lower armature of relay 316, conductor 325, the upper No. 3 armature and back contact of relay 216, the middle upper armature and front contact of relay 205, sleeve lead 230, and the associated brush SB to ground G on the switch terminal ST associated with the terminal set Y2 allocated to the called station B. Relay 322, operated, locks by way of its front contact and upper No. 1 armature to ground on the sleeve lead 230.

A circuit including the windings of relay 231 and 326 is now completed extending from negative battery, through the windings of relay 326, armature and back contact of rotary magnet 317, normal continuity contacts of relay 326, front contact and upper No. 3 armature of relay 322, innermost lower armature and back contact of relay 316, conductor 327, back contact and No. 4 armature of relay 220, winding of relay 231 and its normal continuity contacts, upper No. 3 armature and back contact of relay 216, the middle upper armature and front contact of relay 205, to ground on the sleeve lead 230. Relay 326 does not operate in series with relay 231. Relay 231, however, does operate in the circuit just traced.

Relay 231, operated, locks by way of its alternate continuity contacts, lower No. 3 armature and back contact of relay 224, conductor 306, No. 4 armature and back contact of relay 305, conductor 304, the two lower armature and front contacts of relay 303, to ground, and transfers the locking circuit for relay 322 to the same ground over the same path.

At its inner upper armature and front contact, relay 231 connects the busy tone source 234 to the ring conductor 235, thence over the back contact and No. 1 lower armature of relay 216, ring conductor 236, and thence out over the ring side of the switch train by way of condenser 237 to the calling station A, in well-known manner, to apprise the calling subscriber of the busy condition of the called line. If the originated connection was under the control of an operator, the 60-cycle source 238 is connected to the lead 239 for a similar purpose. The calling subscriber, hearing the busy tone signal, would restore the telephone to its support to release the connection in well-known manner.

*Called line idle*

If the called line is idle, battery through the cut-off relay (not shown) of the called line will be connected to the sleeve lead S, Fig. 1. This battery is designated IB in Fig. 1.

When relay 316 releases, to cause the release of relay 223, as previously described, the latter relay, at its lower armature and back contact, completes a circuit which includes the idle battery IB, sleeve terminal ST of the terminal set Y2 and the connector brush or wiper SB, conductor 230, front contact and middle upper armature of relay 205, back contact and upper No. 3 armature of relay 216, conductor 325, middle lower armature and back contact of relay 316, conductor 229, lower armature and back contact of relay 223, lower winding of relay 220, conductor 240, back contact and upper No. 2 armature of relay 322 (unoperated under this condition), conductor 306, No. 4 armature and back contact of relay 305, conductor 304, the two lower armatures and front contacts of relay 303, and ground.

Relay 223, at its innermost and middle upper back armature contacts, connects battery at the upper No. 5 armature contacts of relay 322 to the left terminal of the winding of relay 216 by way of conductor 330, resistance lamp 331, back contact and lower armature of relay 225, and the upper No. 3 armature and back contact of relay 220, the right terminal of the winding of relay 216 being connected to ground at the two lower armatures and front contacts of relay 303, by way of the normal continuity contacts of relay 216, conductor 241, the lower No. 2 armature and back contact of relay 305, and contacts 333 of the rotary off-normal switch RON. Relay 216 is slow to operate and therefore remains unoperated because of the operation of relay 220 in the circuit traced above.

Relay 220, operated, locks by way of its upper winding to ground at the outer lower armature contacts of relay 303. At its middle lower armature and front contact, relay 220 connects ground to the sleeve conductor 230 and thence to the corresponding conductor of the called line by way of the No. 3 upper armature and back contact of relay 216 and the middle upper armature and front contact of relay 205, to operate the cut-off relay (not shown) of the called line L10, which relay, in turn and in well-known manner, removes the line relay (not shown) from the tip and ring conductors of the called line. Negative battery to relay 220 is furnished through the rotary magnet 317 to prevent double connections should another dial pulse be received while relay 222 is operating.

At its innermost lower armature and front contact, relay 220 completes an obvious operating circuit for relay 224. At its No. 3 lower armature, relay 220 opens the locking circuit for relay 322 and at its No. 2 upper contacts, opens the pulsing circuit to the rotary magnet 317. Relay 224 is slow to operate to provide time for the cut-off relay of the called line L10 to operate in series with relay 220 so as to remove the line relay from the called line before ringing current is applied thereto. Relay 224, operated, cuts the tip and ring conducotrs through for ringing and talking purposes; opens an operating circuit for relay 322; opens the circuit of the release magnet 308; and completes an operating circuit for relay 243 which includes negative battery, the winding of relay 243, conductor 244, the upper No. 3 armature contacts of relay 224, the No. 3 armature and back contact of relay 225, conductor 245, normal continuity contacts of relay 243, and ground at 246.

*Ringing called station*

Ringing the called station B is not started until relay 243 operates from ground at 246, which ground is applied in well-known manner, at a time to insure the correct number of rings being sent out over the line L10. Relay 243, operated, locks to ground at the lower armatures and front contacts of relay 303 by way of its own outer upper armature and front contact.

At its inner lower armature and front contact, relay 243 completes a circuit for relay 322 which includes negative battery, the upper winding of relay 322, conductor 324, the inner lower armature and front contact of relay 243, conductor 250, the upper No. 2 armature and back contact of relay 216, back contact and inner lower armature of relay 226, outermost lower armature and front contact of relay 205, conductor 251 and associated connector brush AB, terminal AT of the terminal set Y2, and conductor 252. The lead 252 is furnished with ground pulses from the interrupter circuit in accordance with the code which is allocated particularly to the called station B and supplied by way of the ringing interrupter R. Relay 322, accordingly, operates and releases in accordance with this code. When relay 322 is operated, ringing current is connected to the called line L10 in a circuit which may be traced from the ringing current source RC, over the front contact and inner upper armature of relay 243, conductor 253, lower No. 2 armature and front contact of relay 322, front contact and upper No. 5 armature of relay 322, conductor 330, back contact and innermost upper armature of relay 223, resistance lamp 331, middle upper armature and back contact of relay 223, back contact and lower armature of relay 225, front contact and lower No. 1 armature of relay 224, conductor 213, innermost lower armature and front contact of relay 205, ring conductor 256 and connector brush RB, connector terminal RT, ring conductor of line L10, windings of ringer 257 at the called station B to ground. Thus, each time relay 322 operates, under control of the code ground applied to bank terminal AT by the ringing interrupter R, ringing current is applied to the line L10 and the ringing at station B responds to this code. It will be noted that all stations whose ringers are connected to the ring side of the line L10 will respond to the transmitted code but only the subscriber at station B, recognizing the code ring as his, will answer the signal. The condenser 258 transmits ringing tone or audible ringing to the calling subscriber during the ringing period.

When relay 322 releases between code pulses, tripping battery at the back contact and upper No. 5 armature of relay 322 is connected to the called line L10. The interrupted ringing continues until the called station B answers the call, whereupon relay 225 operates in a circuit which extends from tripping battery at the upper No. 5 contact of relay 322 over conductor 330, back contact and innermost upper armature of relay 223, resistance lamp 331, middle upper armature and back contact of relay 223, back contact and lower armature of relay 225, front contact and lower No. 1 armature of relay 224, conductor 213, innermost lower armature and front contact of relay 205, conductor 256, connector brush RB, switch terminal RT, thence over the line L10 and the closed loop at station B, switch terminal TT, brush TB, conductor 261, front contact and innermost upper armature of relay 205, conductor 212, upper No. 1 armature and front contact of relay 224, upper No. 1 armature and back contact of relay 225, back contact and outermost upper armature of relay 223, lower winding of relay 225 to ringing ground 260. Relay 225, operated, at its No. 2 armature and front contact, closes an energizing circuit for the upper winding of relay 225 which finds ground, by way of conductor 209, at contacts 314 of the vertical off-normal springs VON. Relay 225 is now fully operated.

At its No. 3 armature contacts, relay 225, operated, opens the energizing circuit for relay 243 causing this relay to release. At its lower and No. 1 upper armatures, relay 225 connects the talking conductors through to the windings of relay 200 to supply talking battery to the called line. The called and calling stations are now connected for talking purposes through the tip and ring condensers 262 and 237.

Relay 200 operates over the closed loop at the called station B and, at its two lower armatures, reverses the battery and ground connections, by way of the windings of relay 300 and conductors 301 and 302, to the calling station for supervision and metering service as is well known in the art. At its inner upper armature and back contact, relay 200 removes ground from the motor start lead 217 to the ringing machine.

*Release of connector*

When the called party at station B, on a nonreverting call, is the first to disconnect, relay 200 releases to again reverse battery towards the calling station. The release of relay 200 also connects ground, by way of its outer upper armature and back contact, to conductor 263, to operate an alarm (not shown) if the calling party fails to disconnect. When the calling party disconnects, relay 300 releases causing relay 303 to release which, in turn, causes relay 316 to operate. The operating circuit for relay 316 includes negative battery, the windings of relay 316, back contact and upper armature of relay 313, contacts 315 of springs VON, No. 3 lower armature contacts of relay 305, back contact and inner upper armature of relay 303, back contact and armature of relay 300 and ground. Relay 316 performs no useful function at this time.

Relay 303, released, removes busy ground from the lead 214 extending to selector S–3 and removes locking ground from relay 220 causing this relay to release. Relay 220 releases relay 224 which, in turn, opens the tip and ring conductors to the connector multiple and closes an operating circuit for release magnet 308. The connector switch then restores to normal in well-known manner, releasing vertical off-normal springs VON, which open the operating circuit to release magnet 308 and the locking circuits for relays 225 and 205.

If the called party disconnects first, the circuit functions as described except that relay 200 is released when relay 224 releases.

If the calling party should disconnect before ringing has started or before ringing is tripped, the release of relays 300 and 303 causes relay 220 to release which, in turn, releases relay 224 to remove ringing from the tip and ring brushes TB and RB, and causes the operation of release magnet 308 to restore the circuit to normal.

*Call to be diverted to intercept machine*

The previous descriptions have been addressed to a call originated at station A and intended for station B and the circuit operations have been described under conditions which find the line L10 busy (ground G on the sleeve conductor) and idle (battery IB on the sleeve conductor). The following description is addressed to the situation which finds the called station B in a condition of not being available for telephone service. In this event the lead K extending from the connector terminal ST to the sleeve lead S would be open.

At the completion of the last digit of the called number, relay 316 releases as described hereinbefore. At its outer upper armature, relay 316 opens the circuit to relay 223 which relay is slow to release. It will now be noted that since the sleeve lead S, insofar as the terminal ST is concerned, is now open and therefore is not connected to ground potential, relay 322 does not operate. When relay 223 releases, a circuit is completed which includes negative battery at the upper No. 5 contacts of relay 322, conductor 330, back contact of innermost upper armature of relay 223, filament of lamp 331, middle upper armature and back contact of relay 223, back contact and lower armature of relay 225, upper No. 3 armature contacts of relay 220, winding of relay 216, normal continuity contacts of relay 216, conductor 241, the lower No. 2 armature and back contact of relay 305, rotary off-normal springs 333, outer lower armature and front contact of relay 303 and ground. Relay 216 is slow to operate to permit relay 220 to operate if the brush SB should encounter battery on the sleeve lead S of the called line. Relay 216, operated, at its upper No. 3 armature contacts opens the sleeve lead 230 to the connector bank; at its lower No. 4 armature contacts it opens the motor start lead 217 to the machine ringing circuit; at its upper No. 2 armature contacts it opens the code lead 251 to the connector bank; at its lower No. 2 armature contacts it connects ground to the start lead 270 to start the intercept machine W; at its lower No. 3 armature contacts it opens the circuit to rotary magnet 317; at its upper No. 4 armature contacts, it opens the operating circuit to relay 223 when relay 316 operates at the time of disconnect; and at its upper and lower No. 1 armature contacts it transfers the tip and ring conductors 271 and 236 from the windings of relay 200 and extends them to the intercept machine W by way of resistors 272 and 273. The removal of the relay 200 from the circuit at this time prevents falsely charging the calling subscriber when the call is transferred to the intercept machine. Resistors 272 and 273 permit several simultaneous connections to the intercept machine being made without permitting conversation between the respective calling subscribers.

The intercept machine W may be of any well-known design and may have any suitable message recorded thereon. When connected to the calling station, as just described, in the event the connector brush SB encounters a station terminal such as ST in the connector bank whose lead K is open-circuited, the prerecorded message is transmitted over the established connection to apprise the calling party of the condition encountered. Such message may take any suitable form, for example, "You have dialed an unassigned number. Please hang up and consult the directory or dial information." Upon receipt of such message the calling party restores the handset to its mounting and thus initiates the release of the connection. The equipment involved in the connection thereupon releases as previously described.

*Rotary hunting—private branch exchange trunks*

The connector switch of this invention may be used also to serve groups of private branch exchange trunks, one such group of trunks being indicated at the lower right of Fig. 1. This group, for exemplary purposes, is indicated as being located in the zero level of the switch. This level of the connector over which rotary hunting is required, is equipped with bridging terminals for both the brushes AB and SB of the upper brush set UB and of the brushes A'B and S'B of the lower brush set LB. This is indicated on the drawing by tying the two bank terminals such as S'B and A'B together.

When the connector is dialed to the trunk level arranged for rotary hunting, the zero level in the exemplary illustration, relay 313 releases in the manner previously described and transfers the pulsing circuit from the vertical magnet 309 to the rotary magnet 317, also as previously described, except that when relay 316 operates, ground is applied by way of the normal post springs 275 to operate relay 226 over an obvious circuit. Relay 226, operated, locks by way of its inner upper armature and front contact, conductors 208 and 209, to ground at contacts 314 of the vertical off-normal springs VON. At its inner lower armature contacts, relay 226 arranges the circuit from the lead 251 for rotary hunting and, at its outer upper armature and front contacts, completes an operating circuit for relay 276 which includes armature contacts 207 of relay 205, conductors 208 and 209 and ground at contacts 314 of vertical off-normal springs VON. The use of relay 276 is optional and may be employed as described above.

Relay 276, operated, cancels supervision for lines in the upper connector bank by reversing the leads from the battery and ground supply by way of the windings of relay 300 so that when relay 200 operates, it does not reverse the battery and ground supply to the incoming tip and ring conductors 203 and 202. At its outer lower armature and front contact, relay 276 connects conductor 239 to the outer upper front contact of relay 200, which, when relays 200 and 225 operate, incident to the response of the called party, finds ground at the upper No. 4 armature contacts of relay 225.

It will be noted that on the first set of connector terminals in the zero level, terminals S'B and A'B, are tied together, as are similar terminals of all other terminal sets excepting the last set. If the second (units) digit dialed into the connector directs the connector switch to an idle station terminal set, the circuit operates as hereinbefore described, except that code ringing is not under control of ringing interrupter. If the second digit directs the switch to a first or intermediate busy terminal group arranged for rotary hunting, relay 316 releases to cause relay 322 to operate as previously described. Ground on conductor 251 shunts relay 231 to prevent its operation and operates relay 326 in a circuit extending from negative battery, through the windings of relay 326, upper armature and back contact of rotary magnet 317, normal continuity contacts of relay 326, upper No. 3 armature contacts of relay 322, innermost lower armature and back contact of relay 316, conductor 327, upper No. 4 armature contacts of relay 220, outer lower armature contacts of relay 231, inner lower front contacts of relay 226, outermost lower front contacts of relay 205, to ground on conductor 251. Relay 236, operated, causes rotary magnet 317 to operate to step the brushes UB to the next terminal set.

Rotary magnet 317, operated, releases relay 326 and applies ground to hold relay 322 operated to prevent the false release of this relay if the terminal set to which the brushes UB are stepped is busy but the next set is idle and the sleeve lead 230 is opened momentarily due to overthrow. Relay 326, released, releases the rotary magnet 317 which removes the locking ground from relay 322 and reconnects relay 231 to the lead 251.

Relay 326 will operate to step the switch in a rotary direction as long as ground is found on the lead 251. When the brushes UB are stepped to an idle set to terminals with battery on the sleeve terminal such as S'B, relay 322 releases and relay 220 operates as previously described. If the sleeve lead is open, relay 216 operates from ground at the outer lower armature contacts of relay 303 and negative battery at the upper No. 5 armature contacts of relay 322. If the last terminal set in the switch level is busy, ground on the sleeve terminal holds relay 322 operated and since the terminals of this set corresponding to terminals S'B and A'B are not tied together, relay 231 operates as previously described. Thus the connector of this invention is capable of serving a group of private branch exchange trunks or other circuits which require the switch to rotary hunt in the group for an idle trunk.

*Reverting calls*

When a station such as station B calls another station, such as station E, on the same line, such as line L10, the busy test of the called terminal, terminal ST, and the transmission of busy tone to the calling station are effected in the manner previously described. When the calling party, in accordance with instructions previously observed, restores the handset to its support after initiating the call to station E, relay 300 releases, which, in turn, releases relay 303 causing relay 316 to operate. Relay 303, being slow to release, holds operated until relay 316 is operated. Relay 316, operated, locks in a circuit which includes negative battery, the winding of relay 316, the back contact and outer upper armature of relay 313, contacts 315 of vertical off-normal springs VON, the lower No. 3 armature contacts of relay 305, front contact and inner upper armature of relay 303, back contact and armature of relay 300 and ground.

With relay 322 operated, as previously described, ground potential is connected to the sleeve wiper SB of the connector switch over a circuit which includes ground at the upper No. 4 armature and back contacts of relay 225, the upper No. 4 armature contacts of relays 216 and 224, conductor 323, outer upper front contacts of relay 316, lower No. 5 alternate contacts of relay 322, normal continuity contacts of relay 313, conductor 325, upper No. 3 armature contacts of relay 216, middle upper armature and front contact of relay 205, conductor 230, wiper SB, and the sleeve terminal ST of the called line L10. On a reverting call, the sleeve of the calling line is the sleeve of the called line, so that relay 305 now operates in a circuit which includes negative battery, the noninductive and lower windings of relay 305, the upper No. 2 contacts of relay 322, and conductors 306 and 307, the latter being connected to the now grounded sleeve lead 214 of the calling line. This same ground locks relays 231 and 322 operated.

Relay 305, operated, locks by way of its upper winding and innermost upper front armature contacts to ground at contacts 314 of vertical off-normal springs VON. At its No. 5 front contacts, relay 305 completes an operating circuit for relay 313 which includes ground at the inner upper armature contacts of relay 316. At its lower No. 2 contacts, relay 305 opens the operating circuit of relay 216.

Relay 313, operated, opens the holding circuit for relay 316 and removes ground from the connector sleeve wiper SB which allows all switches in the train, except the connector switch, to release. When this ground is removed, relays 322 and 231 release, but the circuit to release magnet 308 is open at the continuity contacts at relay 313. Relay 322, released, operates relay 303. With relay 303 operated and relay 316 released, after a short interval, ground is applied to the sleeve lead 230 to guard the circuit from seizure by other selectors. Relay 316, released, also closes a circuit from ground at the lower contacts of relay 303 through the lower winding of relay 220 in series with the cut-off relay (not shown) in the line L10 to battery, which operates relay 220 and the said cut-off relay. Relay 220, operated, locks over its upper winding to ground at the lower armature contacts of relay 303 and operates relay 224, the latter circuit being completed by way of the lower No. 1 armature contacts of relay 220. Relay 316, releasing, also releases relay 313 and opens the circuit to the winding of relay 303, but relay 303 being slow to release holds operated during the operating time of relays 220 and 224.

Relay 224, operated, closes the operating circuit for relay 303. Battery through the winding of rotary magnet 317 and resistor 222 is in parallel to the winding of relay 316 to increase the slow releasing characteristics of relay 316. If no battery is found on the terminal ST of the connector bank for operating relay 220, the connector switch will release when relay 303 releases. Relay 224, operated, opens the locking circuit for relay 322, cuts the tip and ring leads through for ringing and closes an operating circuit from ground at 246 for operating relay 243. The operation of relay 243 starts the ringing of the called station in the manner previously described. Ground over conductor 280 from the ringing interrupter X momentarily operates relay 223 and transmits a short ring on the opposite side of line L10 to that of the code ringing of the called station. The purpose of this is to provide a signal at the calling station when the ringer of the calling station is on the opposite side of the line from that of the called station, when divided ringing is used, so that the calling station will be advised when the called station answers.

When the called station, such as station D, answers, relay 225 operates as previously described and talking battery is supplied to both stations through the windings of relay 200. When relay 225 operates, ground is removed from the winding of relay 303, but relay 303, being slow to release, does not release during the operating time of relay 200 which relay reestablished the holding circuit for relay 303. Relay 303 is held operated from ground at the inner upper front contacts and armature of relay 200 until the connector is released.

If the called party does not answer, the calling party momentarily removes the handset from the switchhook to trip the ringing and to release the connection.

Relay 200 remains operated until both the calling and called stations disconnect. Relay 200 then releases and permits relay 303 to release. Relay 303, released, releases relay 220 which, in turn, releases relay 224. Release magnet 308 now operates in well-known manner to restore the connector to normal. When the connector restores to normal and releases the vertical off-normal springs VON, relays 225 and 305 release and the circuit restores to normal.

What is claimed is:

1. In a dial telephone system comprising subscriber stations and dial-controlled switching means including a connector switch for completing connections between calling and called subscriber stations, said connector switch having station-identifying and vacant terminal sets therein, means for operating said connector switch, an announcement device, means in said connector switch for discriminating between a connection completed to a station-identifying set of connector terminals and a vacant set of connector terminals, and means controlled by said discriminating means for connecting said connector switch to said announcement device and simultaneously disabling said connector switch-operating means.

2. In a dial telephone system comprising subscriber stations and dial-controlled switching means including a connector switch for completing connections between calling and called subscriber stations, a set of terminals in said connector switch including a sleeve terminal, said sleeve terminal being open-circuited when said set of terminals is unassigned, and marked by battery or ground potential when the said set of terminals identifies an idle or a busy station, operating means for said connector switch, an announcement device, and means in said connector switch responsive to the completion of a connection from a calling station to said set of terminals including an open-circuited sleeve terminal, for connecting said connector switch to said announcement device and for disabling said connector switch-operating means.

3. In a dial telephone system comprising subscriber stations and dial-controlled switching means including a connector switch for completing connections between calling and called subscriber stations, station-identifying terminals in said connector switch including a sleeve terminal marked by ground potential when associated with a busy station and by battery potential when associated with an idle station, means controlled from a calling station for advancing a brush of said connector switch into engagement with the sleeve terminal of said station-identifying terminals, and announcement machine, and means in said connector switch responsive to the engagement of a brush thereof with an unmarked sleeve terminal of said station-identifying terminals for connecting said connector switch to said announcement machine and for disabling said brush-advancing means.

4. In a dial telephone system comprising subscriber stations and dial-controlled switching means including a connector switch for completing connections between calling and called subscriber stations, station-identifying terminals in said connector switch including a sleeve terminal adapted to encounter any one of three distinct conditions when said connector is in the process of completing a connection, an announcement device, means in said connector for detecting each of the said three distinct sleeve conditions, and means responsive to the detection of a particular one of the said three sleeve conditions for connecting said connector switch to said announcement machine and for disabling said dial-controlled switching means.

5. In a dial telephone system comprising a multi-party line having a plurality of stations thereon and dial-controlled switching means including a connector switch for completing connections between calling and called subscribers' stations, a common sleeve conductor, each of said stations being identified in said connector switch by a group of bank terminals including a sleeve terminal and all of said sleeve terminals being connectable to said common sleeve conductor, said common sleeve conductor having ground potential applied thereto when any of the stations associated therewith is busy and having battery potential applied thereto when all of the stations associated therewith are idle, and the sleeve terminal of any station disconnected from said line being open-circuited with respect to said common sleeve conductor, an announcement device, and means in said connector switch responsive to the completion of a connection from a calling station to a set of connector terminals the sleeve terminal of which is open-circuited with respect to said common sleeve conductor, for associating said connector switch with said announcement device and for disabling said dial-controlled switching means.

6. In a dial telephone system comprising subscriber stations and dial-controlled switching means including a connector switch for completing connections between calling and called subscriber stations, said connector switch having station-identifying and vacant terminals therein, an announcement device, an intercept trunk associated therewith, means in said connector switch for discriminating between a connection completed to a station-identifying set of terminals and a vacant set of terminals, and means controlled by said discriminating means for connecting said connector to said announcement device by way of said intercept trunk and independently of said switch terminals and for disabling said dial-controlled switching means.

References Cited in the file of this patent

UNITED STATES PATENTS

| | | |
|---|---|---|
| Re. 18,038 | Schwartz | Apr. 7, 1931 |
| 1,950,129 | Whitney | Mar. 6, 1934 |
| 2,021,286 | Butz et al. | Nov. 19, 1935 |
| 2,021,287 | Butz | Nov. 19, 1935 |
| 2,764,636 | Gray | Sept. 25, 1956 |